Feb. 14, 1950
A. H. CARLSON
2,497,256
SCREW HOLDER
Filed June 7, 1945
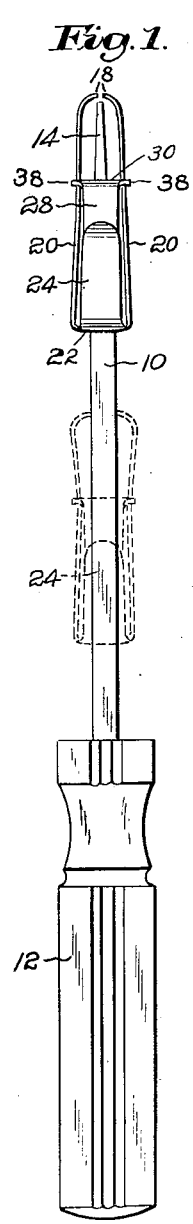
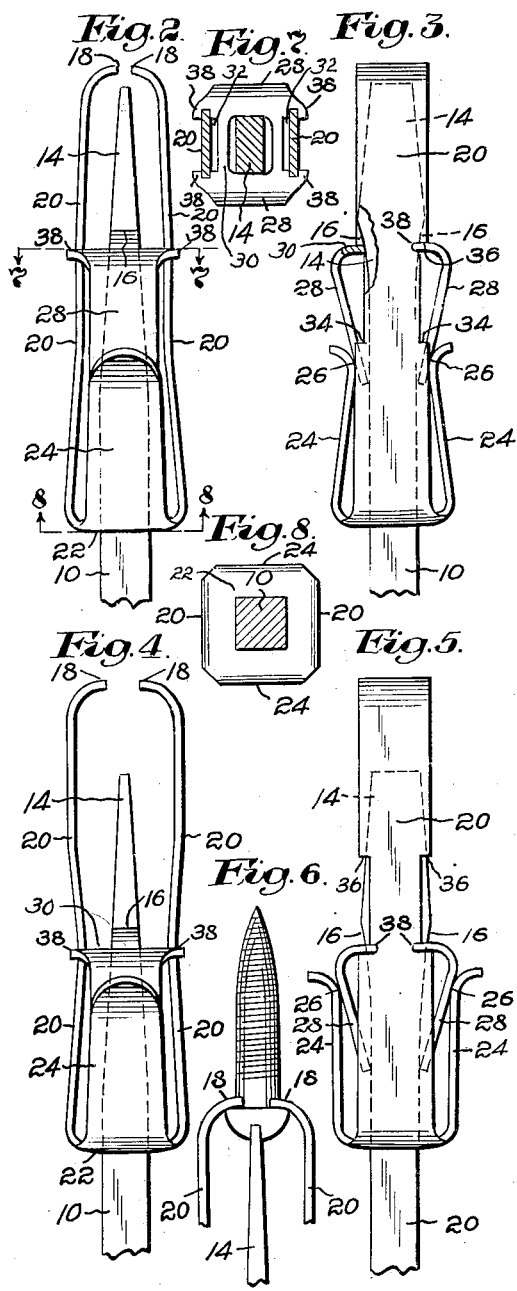
Inventor:
Andrew H. Carlson
by Emery, Booth, Townsend, Neary & Weidner
Attys.

Patented Feb. 14, 1950

2,497,256

UNITED STATES PATENT OFFICE 2,497,256

SCREW HOLDER

Andrew H. Carlson, Worcester, Mass., assignor to Parker Manufacturing Company, Worcester, Mass., a corporation of Massachusetts Application June 7, 1945, Serial No. 598,107

2 Claims. (Cl. 145—52)

This invention relates to screw holders, that is to say, a device for use with a screw driver to hold a screw engaged with the edge of the blade thereof, usually for use during the initial stages of driving or later stages of withdrawing the screw. The object of the invention is to provide an effective and neat device of this description embodying few and simple parts and which is easy to manufacture and assemble. In its general method of operation the device which I am about to describe is similar to that described in the patent to Fegley and Leopold No. 864,633, August 27, 1907, and thus in one aspect may be considered as an improvement on the device of that patent.

The invention will be well understood by reference to the following description taken in connection with the accompanying drawing of a specific embodiment thereof, wherein:

Fig. 1 is an elevation of a screw driver with a screw holder illustrative of the invention in position thereon;

Fig. 2 is an enlarged view of the upper portion of Fig. 1;

Fig. 3 is a corresponding view as seen from the side;

Figs. 4 and 5 are views corresponding to Figs. 2 and 3 showing the parts in another position ready to receive a screw;

Fig. 6 is a view similar to Fig. 4 but showing only the extreme end of the screw driver blade with the screw held in the jaws of the holding device; and Figs. 7 and 8 are sections on the lines 7—7 and 8—8 of Fig. 2, respectively.

In the following description I shall use the word "rearwardly" as signifying away from the edge of the screw driver or toward the handle, that is, downwardly viewing the various figures.

Referring to the drawing, I have there shown an ordinary hand-operated screw driver having a shank 10, conveniently non-circular in section as seen in Fig. 8, and a handle 12 at its rear end. The edge of the tool may be formed on a terminal portion 14 of conventional form in part somewhat wider laterally than the shank and thus constituting an example of a suitable construction providing enlargements 16 (Fig. 3) located rearwardly of the edge of the screw driver and serving as abutments as will hereinafter appear. The screw is maintained on the edge of the tool as shown in Fig. 6 by means of jaws 18 provided on the inturned ends of a pair of spring arms 20 of flat strip material which by means presently to be described are normally retracted rearwardly toward the handle of the screw driver to hold the nick of the screw engaged with the edge of the tool as shown in Fig. 6. In the normal position of the parts the jaws may lie adjacent the edge of the screw driver as shown in Figs. 2 and 3 but the entire mechanism may be slid rearwardly along the shank as to the dotted line position of Fig. 1 out of the way when it is not desired to use it.

Herein the arms 20 are integral extensions from a central portion 22 (see Fig. 8) perforated to encircle and slide on the screw driver shank. Alternating with the arms (and herein also integral with the central portion 22) are flat springs 24 extending forwardly longitudinally of the shank, preferably inclining inwardly somewhat as shown in Fig. 3 and terminating in outwardly curved ends providing inwardly presented bearing portions 26. These bearing portions slide on the diagonally disposed surfaces of two rearwardly and inwardly extending arms 28 which herein are integral extensions bent from the sides of a central perforated washer-like element 30 (see Fig. 7) which encircles the shank and is supported against forward displacement therefrom by the enlargements 16. In the example of the invention shown the rearward ends of the arms 28 rest upon the shank to provide substantially rigid wedges which are adapted to flex the springs 24 outwardly from the position of Fig. 3 to the position of Fig. 5 when the rearward member (comprising the portion 24 and the parts carried thereby) is thrust forwardly and thus set up a tension tending to return the member rearwardly toward the position of Fig. 3.

Herein the part 30, on the sides relatively perpendicular to those from which extend the arms 28, is shown as provided with recesses 32 which receive narrower intermediate portions of the arms 20, which intermediate portions thus present, at their lower and upper ends respectively, shoulders 34 (Fig. 3) and 36 (Fig. 5) which cooperate with the sides of the recesses in the manner shown in those figures to limit relative longitudinal movement of the two members which comprise respectively the central portions 30 and 20 and the parts carried thereby. Preferably the intermediate portions of the arms 20 are so shaped and the distance between the adjacent sides of the recesses (horizontal distance viewing Fig. 7) is such that when the rearward member is pressed outwardly from the position of Figs. 2 and 3 to the position of Figs. 4 and 5 the jaws 18 are spread apart, as best shown in Fig. 4, to facilitate the insertion of the screw between them. When the parts are released to the tension of the springs 20, the jaws engage the under side of the screw head and hold the screw with its nick seated on the edge of the screw driver as shown in Fig. 6. The sides of the recesses may be upset over the outer surface of the arms 20 to provide overhanging lugs 38, best seen in Fig. 7, which retain the arms 20 against casual displacement from the recesses and define a point of flexion for the forward portions of the arms when stressed by the interposed screw.

In the construction illustrated the holder is assembled with the screw driver shank by sliding it on over the shank from the rear end before the handle is attached.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A screw holder for a screw driver having an abutment on its shank adjacent its end comprising a first member having a perforated central portion to encircle the shank of the screw driver rearward of the abutment and to engage the abutment, said member having oppositely positioned arms inclined rearwardly and inwardly, and a second member having a central perforated portion to encircle and slide on the shank and oppositely positioned arms forming longitudinally extending flat springs, the ends of which ride on the arms of the first member and also other arms extending from said central portion at locations between the said second mentioned oppositely positioned arms and extending forwardly past the first member and terminally provided with jaws for engaging the sides of a screw head.

2. A screw holder for a screw driver having an abutment on its shank adjacent its end comprising a first member constituted by a single piece of sheet metal providing a perforated central portion to encircle the shank of the screw driver rearward of the abutment and to engage the abutment, said member having oppositely positioned arms inclined rearwardly and inwardly, and a second member constituted by a single piece of sheet metal providing a central perforated portion to encircle and slide on the shank and oppositely positioned arms forming longitudinally extending flat springs, the ends of which ride on the arms of the first member and also other arms extending from said central portion at locations between the said second mentioned oppositely positioned arms and extending forwardly past the first member and terminally provided with jaws for engaging the sides of a screw head.

ANDREW H. CARLSON.

REFERENCES CITED

The following references are of record in the file of this patent:

UNITED STATES PATENTS

| Number | Name | Date |
| --- | --- | --- |
| 192,901 | Curtis | July 10, 1877 |
| 864,633 | Fegley et al. | Aug. 27, 1907 |
| 1,090,028 | Comb et al. | Mar. 10, 1914 |
| 1,212,743 | Cowell | Jan. 16, 1917 |
| 1,426,320 | Reid | Aug. 15, 1922 |
| 1,522,927 | Wickstrom et al. | Jan. 13, 1925 |
| 1,770,182 | Ritter | July 8, 1930 |
| 2,292,657 | Priest | Aug. 11, 1942 |